United States Patent
Bessko et al.

[15] 3,652,166
[45] Mar. 28, 1972

[54] GEODETIC SIGHTING INSTRUMENT

[72] Inventors: Dezso Bessko; Gyula Gallai; Pal Farnady; Geza Jozsa; Margit Kovy; Laszlo Teller; Andras Suba; Sandor Tisza, all of Budapest, Hungary

[73] Assignee: Magyar Optikai Muvek, Budapest, Hungary

[22] Filed: May 4, 1970

[21] Appl. No.: 34,416

[30] Foreign Application Priority Data

May 16, 1969 Hungary..............................MA-1989

[52] U.S. Cl..................................356/138, 33/46, 350/285, 356/153
[51] Int. Cl......................................................G01b 11/27
[58] Field of Search....................33/46 H, 46; 356/138, 153, 356/172, 152; 350/285

[56] References Cited

UNITED STATES PATENTS

| | | | |
|---|---|---|---|
| 3,321,248 | 5/1967 | Williamson et al. | 356/153 |
| 3,533,700 | 10/1970 | Alexander | 356/138 |

Primary Examiner—Ronald L. Wibert
Assistant Examiner—Jeff Rothenberg
Attorney—Arthur O. Klein

[57] ABSTRACT

Geodetic sighting instrument with a gas laser light source and beaming, sighting and observation systems; the optical axis of said gas laser is arranged in a way free to rotate about a vertical axis and perpendicular to the direction of sighting. The instrument has a light reflecting system consisting of directive mirrors to direct the beam used for the marking of direction, a sighting reflecting device being interposed between said gas laser and said observation system including at least one reflecting device free to rotate about an axis perpendicular to the direction to be marked out.

10 Claims, 5 Drawing Figures

PATENTED MAR 28 1972 3,652,166

INVENTORS
Dezso BESSKO, Gyula GALLAI,
Pal FARNADY, Geza JOZSA,
Mrs. Margit KOVY, Laszlo TELLER,
Andras SUBA and Sandor TISZA BY: Arthur O. Klein
ATTORNEY

GEODETIC SIGHTING INSTRUMENT

The invention relates to a geodetic sighting instrument which is equipped with a laser light source and with beaming, sighting and observation systems; the instrument marks out directions established beforehand, by the projection of a properly beamed light ray of great intensity.

The object of the invention is to design a small-size, lightweight instrument of universal use, having a low power consumption, which is simply handled and which lends itself to biaxial sighting in two directions at the same time.

The invention achieves these results by making the optical axis of the gas laser free to rotate about a vertical axis and placing it perpendicularly to the direction of sighting. Further, a mirror system or a prism system to direct the beam used for marking direction is interposed between the gas laser light source and the observation system, such system including at least one mirror or prism that is free to rotate about an axis perpendicular to the direction to be marked out.

The instrument according to the invention has the following advantages:

Unlike the sighting lasers hitherto known, it is useful not only for the marking of horizontal or nearly-horizontal directions, but also vertical sighting in downwardly and upwardly directions as well; even any chosen point in space may be sighted without any element of the instrument impeding this operation. This is not the case, for instance, with theodolite adapter instruments. In addition, it permits bidirectional aiming, which means that levelling in two directions may be performed at the same time, a problem which could not be solved with conventional levels. As a corollary, vertical sighting upwards and downwards, as, for example, in mines is possible at the same time.

The laser resonator is preferably carried in a small box, made of a material of not more than $3 \cdot 10^{-6}/°$ C. thermal expansion coefficient, preferably invar or quartz; the box is preferably made with a removable lid. The end faces of the box also carry adjustable mirror mountings of simple design. The mirrors are adjusted by means of screws which vary the angular positions of the mirrors against rings made of some resilient material, preferably rubber or plastics, which additionally provide airtight sealing and the secure retention of the screws.

The resonator according to the invention ensures high-grade temperature stability and protects the sensitive laser equipment from dust, moisture and vibration.

The laser supply unit, or the currect source, or both, are preferably integral with the instrument.

The making of the supply unit or current source integral with the instrument has the advantage that high-voltage cables that make connections to the lasers in the known instruments are dispensed with.

The instrument according to the invention will be further described by way of example with reference to the accompanying drawing in which:

FIG. 1 schematically shows the resonator according to the invention.

Figure 1:
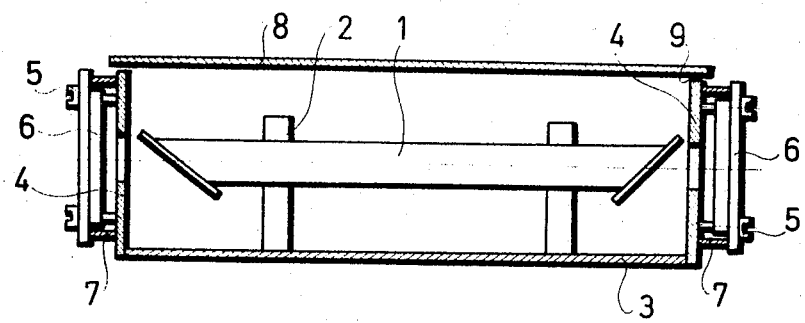

In Figure 1, a laser tube 1 is fastened by carriers 2 to an invar box 3. The end plates of the box support mirror holders 6 that house resonator mirrors, not shown in the drawing. Said mirror holders 6 are forced against the end plates 4 of said box 3 by adjusting screws 5 against the effect of resilient rings 7. When the resonator has been adjusted, a lid 8 is fastened to the box 3 by screws, not shown in the drawing. Said rings 7 and a likewise resilient sealing 9 around said lid 8 provide airtight sealing for the laser.

Figure 2:
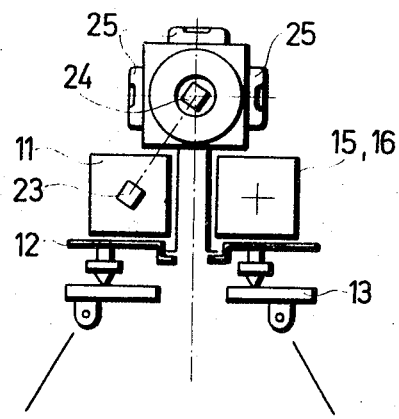
FIG. 2 is a schematic side view of the instrument.
Figure 3:
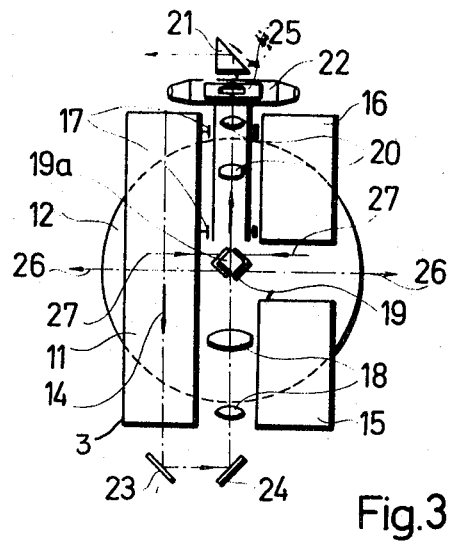
FIG. 3 is a schematic top view of the instrument.

The instrument is shown in detail in FIGS. 2 and 3. The instrument has a base 12 mounted on a tripod 13 about which the plate 12 is free to rotate about a vertical axis. Said base plate 12 carries a laser supply unit 15 and a power supply unit 16, as well as a sighting system 19 and a levelling system 22 rotatable in bearings 17. The instrument also carries directional mirrors or prisms 23, 24, a beaming telescope 18, and an observation system consisting of mirrors or prisms, 19a, a telescope 20, and a prism 21 fixed to said sighting system 19.

In the embodiment shown, said levelling system 22 consists of three bubble levels 25 located in the same plane in U-shape, keyed on a common axle with mirrors or prisms 19, 19a.

Figure 4:
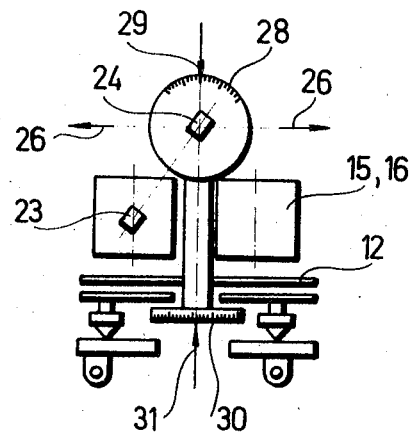
FIG. 4 is a side view of the instrument provided with an angular measuring device.

Instead of the said levelling system 22, an angle measuring system may be used if the fixing of oblique directions chosen in advance is desired. This variant is schematically shown in FIG. 4. Here, the vertical circle 28 divided into 360°, known per se, rotates together with the mirror 19 shown in FIG. 3 before an index 29 serving for reading-off, thereby indicating the vertical angle of the fixed direction. The horizontal angle of the fixed direction can be similarly determined by means of the graduated circle 30, rotating together with the base plate 12 and of the fixed index 31 in a manner known otherwise with geodetic instruments.

The instrument discussed above works as follows: After having taken station and levelled the instrument by known methods, said supply unit 15 is switched on to start laser 11. The axis of the laser and, with it, the direction of the light beam emitted, indicated in Figure 3 by arrow 14, are set perpendicular to the direction to be marked, say, horizontal, indicated in the Figure by arrow 26, by turning said base plate 12 about a vertical axis. Following this, the light of the laser passes via 14-23-24 to said beaming telescope 18, under whose effect, in a way known per se, the diameter of the beam increases and its divergence decreases. After this the beam is split into two parts on the two mirrors of sighting system 19, and since said two mirrors are perpendicular to each other, it leaves the instrument in opposite directions as indicated by arrows 26, to be intercepted on screens or signal boards located on the required spots. In this way the direction is marked out.

When said mirrors 19 are in the positions represented in FIG. 3, the direction sighted is horizontal. Considering, however, that said mirrors 19 are tiltable about a horizontal axle mounted in said bearings 17, light can leave the instrument in a plane perpendicular to the axle in any direction.

The image of the light beam intercepted by the screen or signal board passes through said mirrors 19a that rotate together with said mirrors 19 into said observation telescope 20 and can be watched on said prism 21.

In the embodiment shown in Figures 2, 3, said mirrors 19 and 19a are double. One of them, of course, may be left off. In this case the light beam will leave and can be observed in a single direction only. Said mirrors 19, 19a may be replaced by an optical prism known per se.

The instrument is mainly used for the fixing of horizontal and vertical directions. Said levelling system 22 rotating together with said mirrors 19, 19a permits the quick performance of such operations. The two bubble levels 25 of this system are used for the fixing of horizontal direction, the third for vertical direction. Their function is easily understood without any further explanation.

If the marking of oblique directions is also required, said system 22 is composed, instead of three bubble levels, of a known graduated circle and a reading device (angle measuring system), not shown. Another embodiment of said level system 22 may be a known compensator level or plumb.

The laser supply unit is characterized by two transverters, preferably working at a frequency not lower than 20 kHz and owing to this, of small size, one of them supplying operation voltage, the other starting voltage to the laser. The latter operates only from the instant of switching on to that of starting, and is protected by a diode that bridges its terminals.

Figure 5:
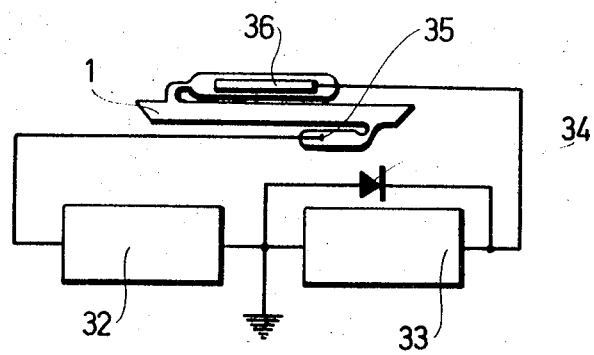
FIG. 5 is a diagram showing the manner of connection of the laser tube and the power supply unit.

In FIG. 5 to the anode 35 of the laser tube 1 the transverter 32 known per se is connected supplying the operating voltage of the tube. To the cathode 36 of the tube, the transverter 33 is connected supplying the voltage surplus necessary for the starting. The transverter 33 is bypassed by the diode 34 which after the ignition of the tube cuts out the transverter 33 thus the latter operating only up to the moment of the ignition. It is advantageous to build the power supply unit and the current source together with the instrument, as above-described and as shown in the drawings since this eliminates the necessity for high-voltage output cables.

What we claim is:

1. A device for establishing a sight line in a predetermined desired direction, said device comprising a support, a geodetic sighting instrument mounted on said support, said instrument comprising a gas laser light source, a beaming system for receiving light from the laser light source and forwarding it as an expanded, collimated laser beam, a sighting system for receiving the beam of laser light and emitting it in a line outwardly of the instrument, and an observation system for observing target impingement of the emitted laser beam, the support and the instrument carried thereby being rotatable about a vertical axis, a first reflecting system to direct the laser light from the laser source to the beaming system, said sighting system comprising a second reflecting system including at least one reflecting means free to rotate about an axis perpendicular to said vertical axis and to the direction of the emitted laser beam, whereby the emitted laser beam can be directed in any desired direction to establish said sight line.

2. A device as claimed in claim 1, wherein the observation system comprises at least one reflecting means free to rotate about an axis common with that of the reflecting means of the second reflecting system, a telescope coaxial with said axis, and a prism.

3. A device as claimed in claim 2, further comprising a levelling (or angle measuring) system rotating together with the sighting and observation reflecting means.

4. A device as claimed in claim 1, wherein the gas laser has a resonator comprising mirrors set in mirror holders by means of sealing elements made of resilient material, an enclosure for the gas laser made of material having a thermal coefficient of expansion not more than $3 \times 10^{-6}/°C.$, said enclosure having end plates, said mirror holders being adjustably fastened to the end plates of the enclosure.

5. A device as claimed in claim 1, further comprising an operation transverter connected to one of the electrodes and to the ground terminal of said gas laser, and another, starting transverter connected to the other electrode and the ground terminal of said gas laser, and a diode bridging the output terminals of the starting transverter.

6. A device as claimed in claim 5, wherein the operation frequency of said starting and operation transverters is not less than 20 kHz.

7. A device as claimed in claim 1, further comprising a laser supply unit integral with the instrument.

8. A device as claimed in claim 1, further comprising a current source integral with the instrument.

9. A device as claimed in claim 8, further comprising a laser supply unit integral with the instrument.

10. A device as claimed in claim 2, further comprising an angle measuring system rotating together with the sighting and observation reflecting means.

* * * * *